(12) United States Patent
Roberts et al.

(10) Patent No.: US 7,171,762 B2
(45) Date of Patent: Feb. 6, 2007

(54) SELF-CLEANING CENTRIFUGAL PELLET DRYER AND METHOD THEREOF

(75) Inventors: John P. Roberts, Troutville, VA (US); Charles E. Aaron, Buchanan, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 31 days.

(21) Appl. No.: 10/967,305

(22) Filed: Oct. 19, 2004

(65) Prior Publication Data
US 2006/0080855 A1 Apr. 20, 2006

(51) Int. Cl.
*F26B 5/08* (2006.01)
(52) U.S. Cl. ............... 34/312; 34/59; 34/166
(58) Field of Classification Search .............. 34/312, 34/58, 166, 59; 210/139; 366/97
See application file for complete search history.

(56) References Cited

U.S. PATENT DOCUMENTS

| | | |
|---|---|---|
| 3,458,045 A | 7/1969 | Dudley |
| 4,090,309 A | 5/1978 | Rollins |
| 4,218,323 A | 8/1980 | McCracken |
| 4,476,019 A | 10/1984 | Nowisch et al. |
| 4,565,015 A | 1/1986 | Hundley, III |
| 4,570,359 A | 2/1986 | Rudolph |
| 4,833,793 A | 5/1989 | White |
| 4,896,435 A | 1/1990 | Spangler, Jr. |
| 5,074,057 A | 12/1991 | Kanai |
| 5,182,008 A * | 1/1993 | Shelstad ............ 210/139 |
| 5,187,880 A | 2/1993 | Rudolph |
| 5,197,205 A | 3/1993 | Spada et al. |
| 5,265,347 A | 11/1993 | Woodson et al. |
| 5,333,396 A | 8/1994 | Kanai |
| 5,505,537 A | 4/1996 | Previero |
| 5,611,150 A | 3/1997 | Yore, Jr. |
| 5,638,606 A | 6/1997 | Bryan et al. |
| 5,987,769 A | 11/1999 | Ackerman et al. |
| 6,237,244 B1 | 5/2001 | Bryan et al. |
| 6,430,842 B1 | 8/2002 | Hauch |
| 6,807,748 B2 | 10/2004 | Bryan et al. |

FOREIGN PATENT DOCUMENTS

| | | |
|---|---|---|
| DE | 31 20 792 A1 | 12/1982 |
| DE | 43 38 030 C1 | 11/1994 |
| FR | 330 215 | 3/1903 |
| WO | WO 97/41290 | 11/1997 |

* cited by examiner

*Primary Examiner*—S. Gravini
(74) *Attorney, Agent, or Firm*—Jacobson Holman PLLC

(57) ABSTRACT

A self-cleaning centrifugal pellet dryer and method for removing surface moisture from pellets and enabling complete removal of all pellets from the dryer after each drying cycle. By eliminating dried pellets retained in the dryer, contamination of different type pellets dried during a subsequent drying cycle is avoided. Air and water under pressure are discharged toward various pellet hang-up points in the dryer to remove retained pellets.

20 Claims, 6 Drawing Sheets

SELF-CLEANING CENTRIFUGAL PELLET DRYER AND METHOD THEREOF

BACKGROUND OF THE INVENTION

1. Field of the Invention

The present invention generally relates to a centrifugal pellet dryer and more specifically to a self-cleaning dryer and method for removing surface moisture from pelletized product discharged from an underwater pelletizer as a slurry of pellets and water.

2. Description of the Prior Art

Underwater pelletizers which produce a pelletized product in the form of a slurry of pellets and water are well known in the pelletizing industry and in many patents including U.S. Pat. No. 5,059,103 issued Oct. 22, 1991. Centrifugal pellet dryers are also well known and disclosed in various patents including U.S. Pat. No. 6,237,244 issued May 29, 2001. Both of the cited patents are owned by Gala Industries, Inc. (hereinafter "Gala"), the assignee of this application. Additionally, prior patents exist which disclose various structures for drying pellets as illustrated in the following U.S. Pat. Nos. 4,476,019; 4,570,359; 5,187,880; 5,505,537; 5,611,150; 5,638,606; and 5,987,769.

The centrifugal pellet dryers in the prior art satisfactorily dry pellets when properly operated. However, existing pellet dryers have areas in which the pellets being dried become lodged or accumulate. These areas are generally known as hang-up points in which pellets remain after a drying cycle has been completed. The pellets lodged in various hang-up points do not present a problem as long as the same pellet slurry is supplied to the dryer.

However, in many instances, a centrifugal pellet dryer is used to dry different pellets during sequential drying cycles. When a subsequent drying cycle is drying pellets different from the pellets in a previous drying cycle, some of the pellets of the previous drying cycle that have been lodged in the hang-up points will be entrained in and mixed with different pellets being dried in a subsequent drying cycle. This circumstance results in contamination of the pellets being dried in the subsequent drying cycle with pellets that remained in the hang-up points during a previous drying cycle.

The present invention is a self-cleaning dryer and method which overcomes the problems of hang-up points in prior dryers by eliminating the dried pellets from the hang-up points. Thus, contamination of pellets being dried in a drying cycle by pellets left over in various hang-up points during a previous drying cycle in which different pellets were dried is avoided.

SUMMARY OF THE INVENTION

The centrifugal pellet dryer in accordance with this invention includes a combination of high pressure air and/or water directed toward the hang-up points or areas of the dryer in which pellets being dried have become lodged. The self-cleaning method eliminates contamination of pellets subsequently passing through the dryer by previously dried pellets that have become lodged in the hang-up points or areas of the dryer.

The self-cleaning dryer and method of the present invention enable complete removal of all pellets from the dryer during one drying cycle thereby eliminating contamination of pellets being dried in a subsequent drying cycle. The air and water pressure is discharged toward various pellet hang-up points in the dryer and includes timing controls for operating various stages of the discharge of the pressurized air and water. As used in this specification, the term "pressurized fluid" is intended to include pressurized water or other liquid, pressurized air or other gas, or any combination of the foregoing. Air is preferably pressurized from about 60 psi to about 80 psi, or more, for use in accordance with the present invention. Water is pressurized to flow at a rate of at least 40 gallons per minute (gpm), and preferably between about 80 gpm and 100 gpm, or more.

The self-cleaning centrifugal pellet dryer in accordance with this invention includes a generally vertical, substantially cylindrical housing, a substantially cylindrical screen mounted within the housing, and a slurry inlet at a lower end of the housing communicating with the lower end of the screen. The screen includes a perforated peripheral wall in spaced relation to the housing. A rotor, provided with inclined radial lifting blades, is mounted inside the screen. The rotor is drivingly connected to a motor and the upper end portion of the screen is communicated with a dried pellet discharge chute, and the water separated from the pellets is discharged into an underlying water tank.

An agglomerate catcher and pellet dewaterer preferably receive the slurry of water and pellets in advance of the dryer. The agglomerate catcher first catches, separates and discharges agglomerated pellets before the slurry enters the dewaterer. The dewaterer then separates the bulk water from the pellets prior to the pellets entering the screen at the lower end thereof. Once the water has been removed, the pellets still include surface moisture which is removed during elevational and centrifugal movement of the pellets by rotation of the rotor within the screen and circulation of air by a blower which removes moisture from the interior of the housing. The above described dryer and its operation are representative of well known centrifugal pellet dryers with agglomerate catchers and pellet dewaterers.

During normal operation of the dryer, some pellets become lodged in hang-up points or areas in the dryer as well as in valves in a water box bypass of the underwater pelletizer. The removal of pellets in these hang-up points in the self-cleaning dryer of this invention eliminates contamination of pellets from a previous drying cycle by being subsequently picked up and mixed with pellets of a different type being dried in a subsequent drying cycle. The elimination of this contamination is accomplished by introducing high pressure fluid into the hang-up areas at the end of each drying cycle for one type pellet, thereby cleaning any residual pellets from the dryer before commencing a subsequent drying cycle for another type pellet.

The self-cleaning centrifugal pellet dryer of the present invention includes the introduction of timed discharge of pressurized fluid through spray nozzles strategically located to purge or remove pellets lodged in the hang-up points of, or otherwise left in, the dryer after completing a drying cycle. This self-cleaning is accomplished in part by spray nozzles oriented in circumferentially spaced and vertically staggered relation between the interior of the housing and the exterior of the cylindrical screen. These spray nozzles direct a high pressure fluid against the interior wall of the housing, the exterior wall of the cylindrical screen, and through the cylindrical screen to also flush the area between the rotor and inside surface of the cylindrical screen. When air or other gas is used as the pressurized fluid, dislodged pellets within the screen area are driven out through the dried pellet outlet. When water or other liquid is used as the pressurized fluid, any pellets lodged in the housing, outside the cylindrical screen, will be flushed to the underlying water tank.

Other high pressure fluid spray nozzles are strategically located to direct the pressurized fluid at other hang-up points, including the pellet agglomerate catcher which receives the slurry from the underwater pelletizer, the rotor, the base and tub section of the dryer, the dryer top section, the dried pellet discharge chute, and the pellet diverter valve located at the end of the dried pellet discharge chute. Also, a higher volume blower can be communicated with the housing.

In a preferred embodiment, a water surge is directed into the dryer by injecting high pressure air into the water box bypass line. High pressure air is sequentially directed at the top of the rotor adjacent the dryer top section, at the bottom of the rotor adjacent the base and tub section of the dryer, at the dried pellet discharge chute and at the pellet diverter valve located at the end of the dried pellet discharge chute. The pressure of the air through the foregoing spray nozzles is preferably about 60 psi to about 80 psi, or more. Thereafter, high pressure water at a flow rate of preferably about 80 gpm to 100 gpm is directed to the interior of the housing and the exterior of the cylindrical screen through a plurality, preferably three or more, of spray heads circumferentially spaced and vertically staggered around the cylindrical screen. Most preferably, the high pressure air to the bottom of the rotor adjacent the base and tub section of the dryer is operated continuously.

Accordingly, it is an object of the present invention to provide a self-cleaning centrifugal pellet dryer and method for removing surface moisture from pelletized product in the form of a slurry of water and pellets in order to eliminate contamination between different pellets being dried in sequential drying cycles during operation of the dryer.

Another object of the present invention is to provide self-cleaning centrifugal pellet drying by discharging pressurized fluids into pellet hang-up points or areas within the centrifugal pellet dryer and associated underwater pelletizer equipment.

A further object of the present invention is to provide a self-cleaning centrifugal pellet dryer and method in which pressurized fluid, preferably high flow rate water, is directed onto or toward various hang-up points by spray nozzles oriented in circumferentially spaced and vertically staggered relation between the interior of the housing and the exterior of the cylindrical screen.

Yet another object of the present invention is to provide a self-cleaning centrifugal pellet dryer and method in accordance with the preceding object which directs pressurized fluid, preferably high pressure air, at specific hang-up points in the dryer including: at the top of the rotor inside the dryer top section; from inside the rotor for discharge from the lower end of the rotor toward the base and tub section of the dryer; inside the dried pellet chute; and toward the dried pellet diverter valve.

A final object of the present invention to be specifically set forth herein is to provide a self-cleaning centrifugal pellet dryer and method in accordance with the preceding objects which will conform to conventional forms of manufacture and operation, and will be economically feasible, long-lasting and relatively trouble-free in use.

These together with other objects and advantages which will become subsequently apparent reside in the details of constructions and operation as more fully hereinafter described and claimed, reference being had to the accompanying drawings forming a part hereof, wherein like numerals refer to like parts throughout. The drawings are intended only to illustrate the present invention and should not be considered to scale.

DESCRIPTION OF THE PREFERRED EMBODIMENT

Figure 1:
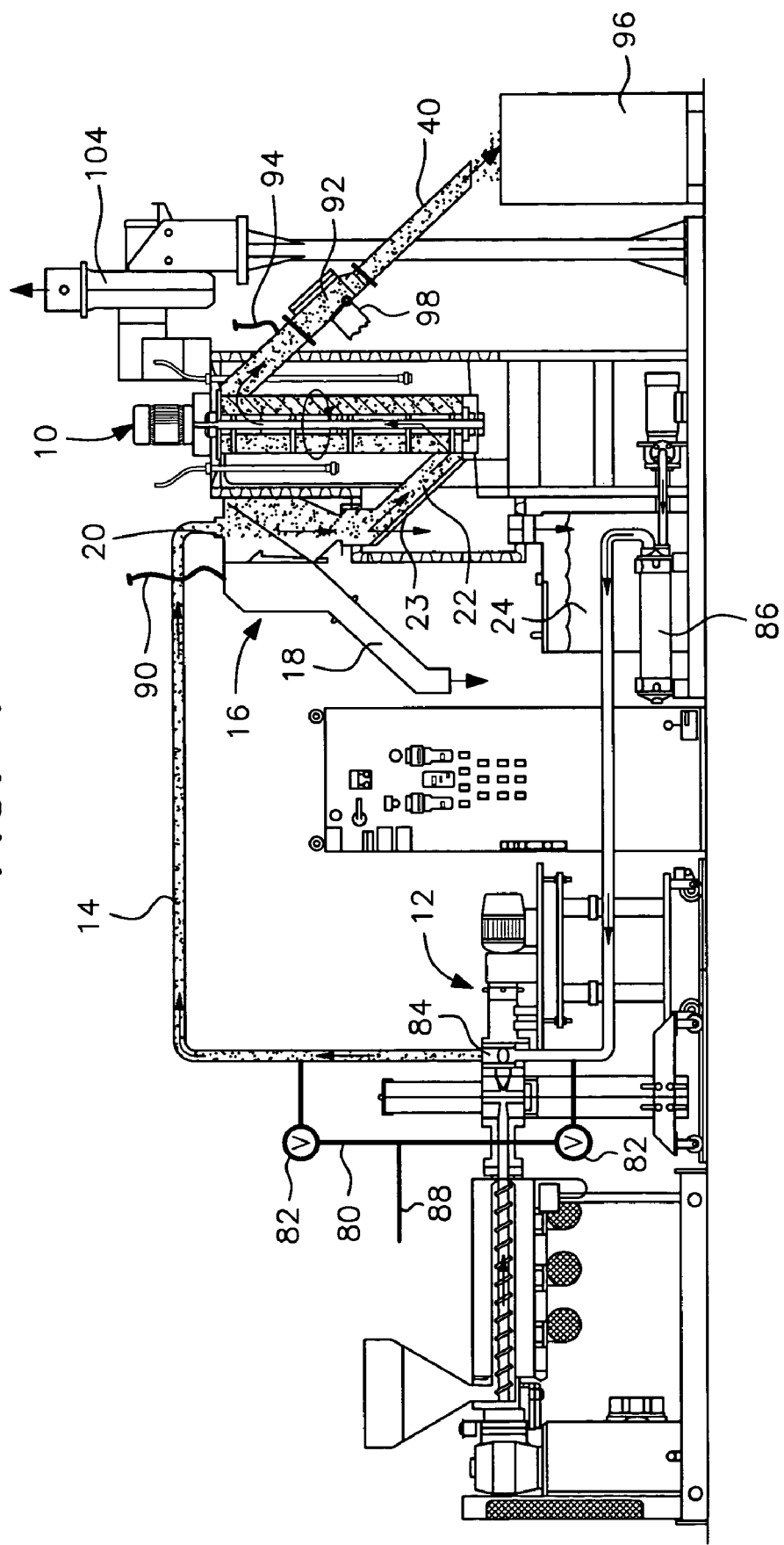
FIG. 1 is a schematic illustration of an underwater pelletizer and centrifugal pellet dryer system in which a self-cleaning dryer and method of this invention are used.

Although preferred embodiments of the invention are explained in detail, it is to be understood that other embodiments are possible. Accordingly, it is not intended that the invention is to be limited in its scope to the details of constructions and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Referring specifically to the drawings, a Gala centrifugal pellet dryer modified to incorporate the structure and method of the present invention is illustrated in FIGS. 2–5 and is generally designated by reference numeral 10. FIG. 1 of the drawings schematically illustrates a typical Gala dryer 10, associated with an underwater pelletizer generally designated by reference numeral 12, that produces and discharges a pelletized product in the form of a slurry of pellets and water which is conveyed to the pellet dryer 10 through a slurry pipe 14. The pipe 14 discharges the pellets and water slurry into an agglomerate catcher 16 which catches, removes and discharges pellet agglomerates through a discharge chute 18. The agglomerate catcher 16 includes an angled perforated plate or screen 20 which permits passage of water and pellets but collects agglomerated pellets and directs them toward the discharge chute 18. The pellets and water slurry then passes into a dewaterer 22 which includes an inclined perforated screen 23 that enables water to pass downwardly into a water tank 24. The pellets which still retain moisture on their surfaces are discharged from dewaterer 22 into the lower end of the dryer 10 at a slurry inlet 25 (see FIG. 2).

Figure 2:
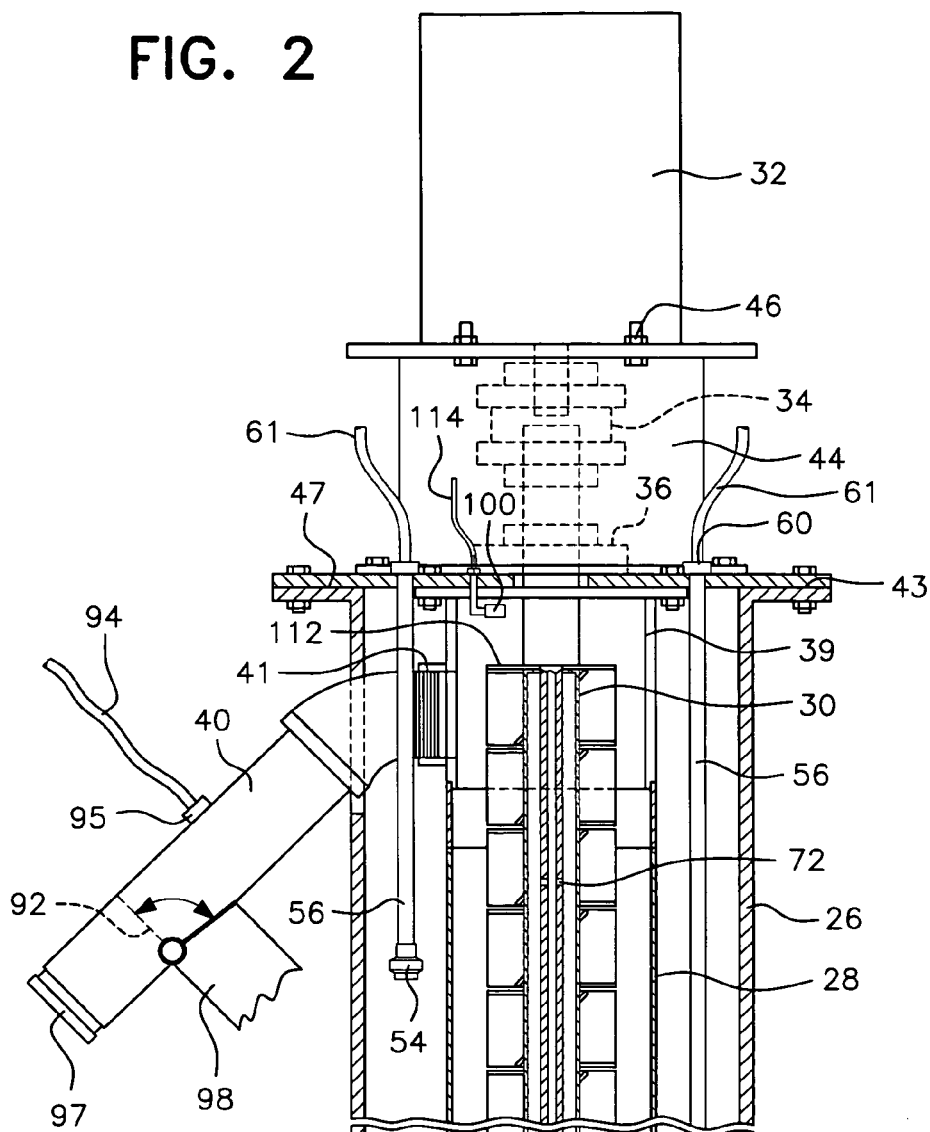
FIG. 2 is a schematic sectional view of a dryer embodying the present invention and illustrating the spray nozzles between the dryer housing and perforated screen as well as the slurry inlet, the dried pellet discharge chute, the water tank, the cylindrical screen, and the rotor and hollow shaft therein.

As illustrated in FIG. 2, the self-cleaning centrifugal pellet dryer 10 includes a generally cylindrical housing 26 having a vertically oriented generally cylindrical screen 28 mounted between a cylindrical base and tub section 77 at the bottom, and a cylindrical top section 39 at the top. The screen 28 is thus positioned concentrically within the housing 26 in radially spaced relation from the inside wall of the housing.

A vertical rotor 30 is mounted for rotation within the screen 28 and is rotatably driven by a motor 32 preferably mounted atop the upper end of the dryer. The motor 32 is connected to the rotor 30 by a drive connection 34 and through a bearing 36 connected with the upper end of the housing. The connection 34 and bearing 36 support the rotor 30 and guide the rotational movement of the upper end of the rotor. The slurry inlet 25 is in communication with the lower end of the screen 28 and rotor 30 through tub section 77 at connection 38, and the upper end of the housing and rotor is in communication with a dried pellet discharge chute 40 through connection 41 in top section 39 at the upper end of the housing. A diverter plate 98 in outlet 40 can divert dried pellets out of exit 97 or exit 98.

The housing 26 of the dryer 10 is of sectional construction connected at a flanged coupling 42 at a lower end portion of the dryer and a flanged coupling 43 at the upper end portion of the dryer. Flange coupling 43 is connected to a top plate 47 which supports bearing structure 36 and drive connection 34 which are enclosed by a housing or guard 44. A coupling 46 atop the housing 44 supports the motor 32 and maintains all of the components in assembled relation.

The lower end of the housing 26, designated by reference numeral 48, is connected to a bottom plate 100 on top of a water tank 49 by a flange connection 50. Apertures 52 communicate the lower end 48 of the dryer housing with the water tank 49 for discharge of water from the housing 26 into the water tank 49 for discharge of water from the housing 26 into the water tank 49 as the surface moisture is removed from the pellets. This removal is achieved by action of the rotor which elevates the pellets and imparts centrifugal forces to the pellets so that the impact against the interior of the screen 28 will remove moisture from the pellets with such moisture passing through the screen and ultimately into the water tank 49 in a manner well known in the art. The above components generally are found in the Gala centrifugal pellet dryers such as that disclosed in the aforementioned U.S. Pat. No. 6,237,244 by comparing FIG. 2 of the drawings in this application with FIG. 6 of the patent.

The self-cleaning structure of the present invention includes a plurality of spray nozzles or spray heads 54 supported between the interior of the housing 26 and the exterior of the screen 28 as illustrated in FIG. 2. The nozzles 54 are supported at the lower end of spray pipes 56 extending upwardly through top plate 47 at the upper end of the housing with the upper ends 60 of the spray pipes 56 being exposed. Hoses or lines 61 feed high pressure fluid, preferably water at a flow rate of at least 40 gpm, and preferably about 60 gpm to about 80 gpm, or more, to the spray nozzles 54. The hoses 61 can all feed off a single manifold (not shown) mounted on the dryer 10, if desired.

There are preferably at least three spray nozzles 54 and related spray pipes 56 and lines 61. The spray nozzles 54 and pipes 56 are oriented in circumferentially spaced relation peripherally of the screen 28 and oriented in staggered vertical relation so that pressurized fluid discharged from the spray nozzles 54 will contact and clean substantially the entire screen 28, inside and out, as well as the interior of the housing 26. Thus, any collected pellets that may have accumulated or lodged in hang-up points or areas between the outside surface of the screen 28 and inside wall of the housing 26 are flushed through apertures 52 into the water tank 49. Similarly, leftover pellets inside the screen 28 (and outside rotor 30) are flushed out of the dried pellet chute 40. Thus, such pellets will not contaminate or become mixed with pellets passing through the dryer during a subsequent drying cycle in which a different type pellet is dried.

Figure 3:
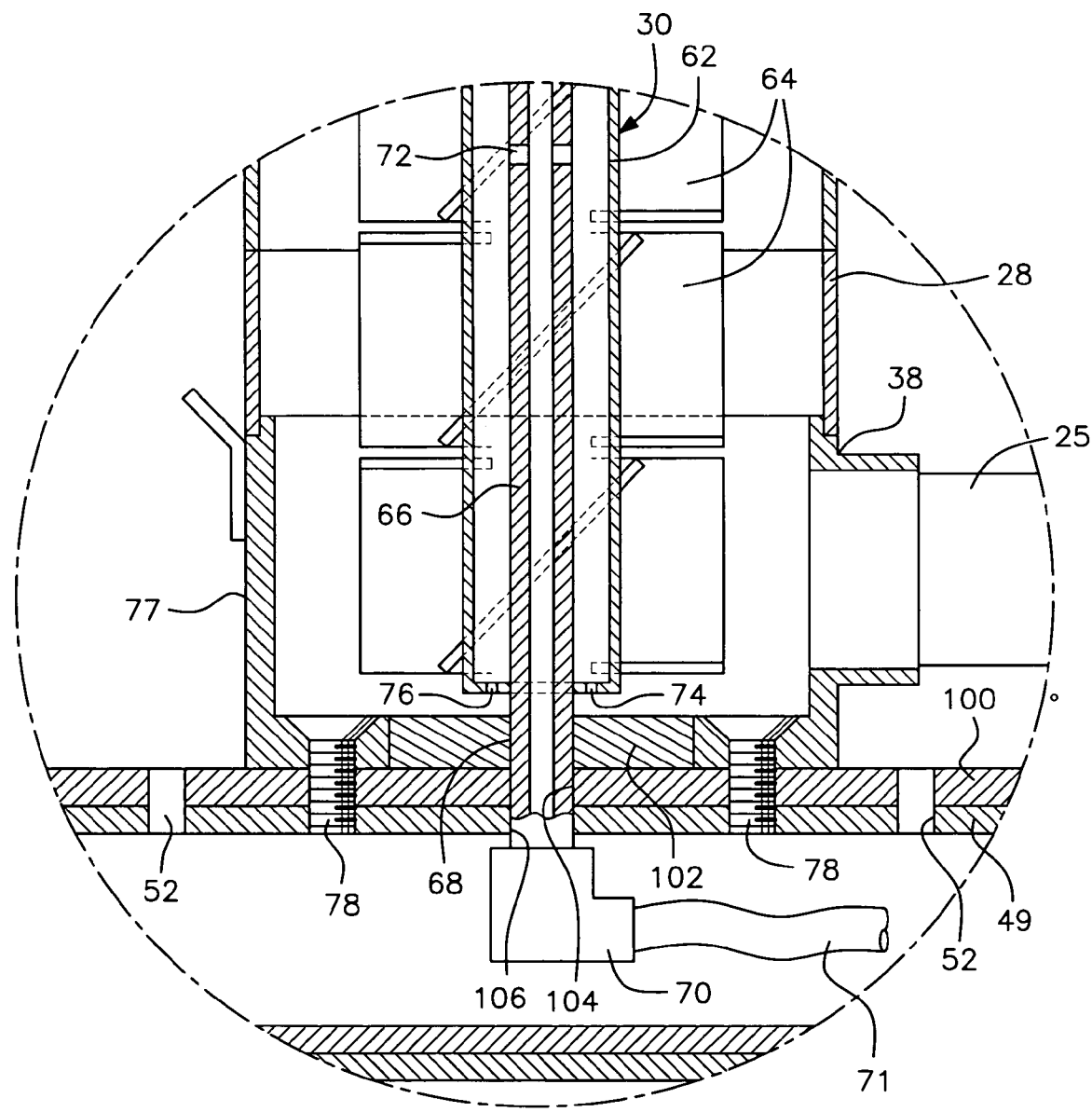
FIG. 3 is an enlarged detailed sectional view from FIG. 2 showing the rotor and illustrating the hollow shaft within the rotor and apertures communicating the interior of the hollow shaft and the interior and exterior of the rotor.
Figure 4:
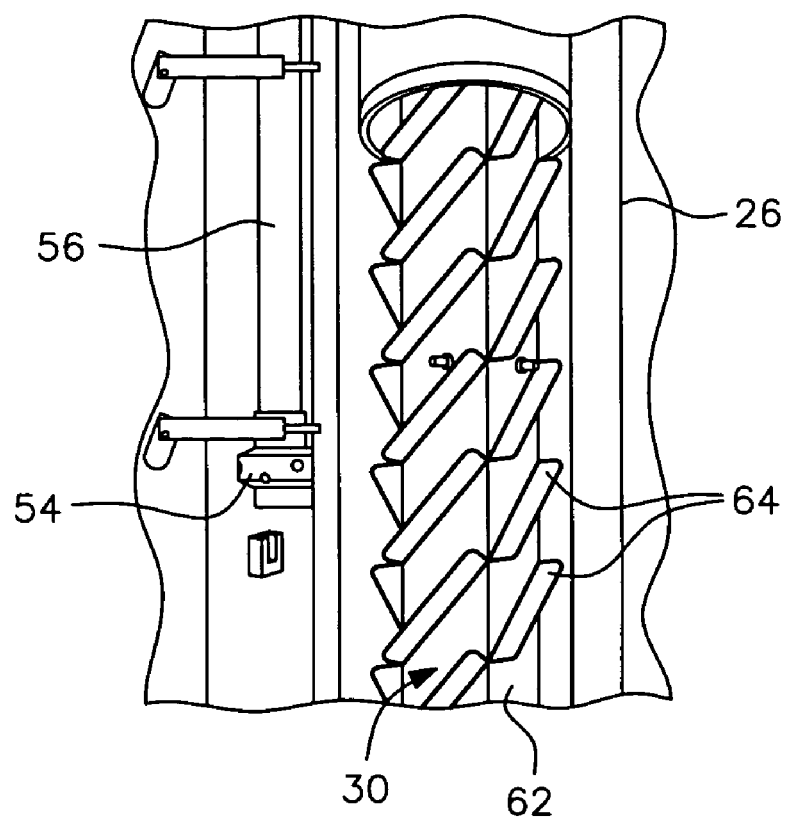
FIG. 4 is a fragmental perspective view inside the dryer of FIG. 2 illustrating the relationship of the dryer housing, rotor and one spray nozzle observed through a door opening in the housing.
Figure 5:
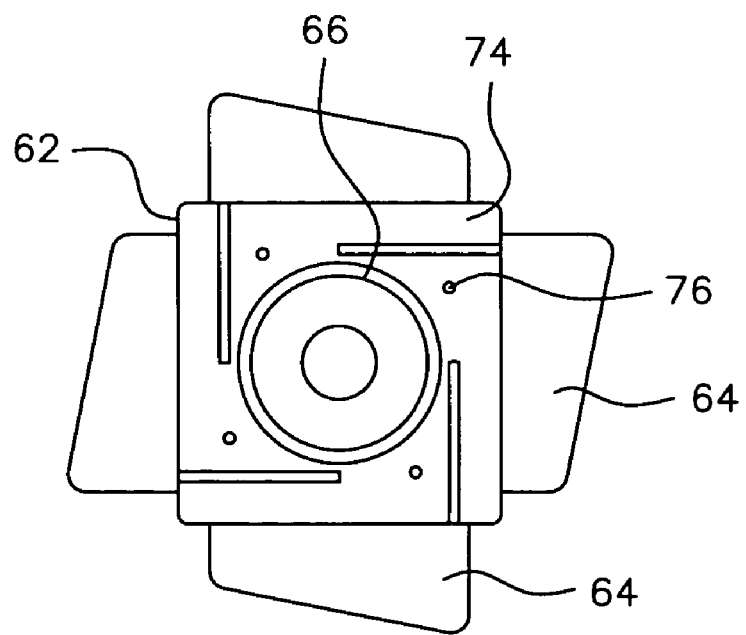
FIG. 5 is a bottom view of the rotor of the dryer of FIG. 2 illustrating the apertures in the lower end of the rotor for spraying the interior of the rotor with the base and tub section of the dryer.

Turning to FIG. 3, the rotor 30 includes a substantially square tubular member 62 provided with inclined rotor blades 64 thereon for lifting and elevating the pellets and impacting them against the screen 28. In other dryers, the rotor 30 can be round, hexagon, octagon or other shape in cross-section. A hollow shaft 66 extends through the rotor 30 in concentric spaced relation to the hollow square member 62 forming the rotor. The hollow shaft guides the lower end of the rotor as it extends through an opening 68 in a guide bushing 102 at the lower end of the rotor, as well as aligned openings 104 and 106 in bottom plate 100 and the top wall of the water tank 49, respectively. A rotary coupling 70 is connected to the hollow shaft 66 and to a source of fluid pressure supply (not shown), preferably air, through hose or line 71 to pressurize the interior of the hollow shaft 66.

The hollow shaft 66 includes apertures 72 to communicate the interior of the hollow shaft 66 with the interior of the square rotor member 62 as illustrated in FIGS. 2 and 3. These holes 72 introduce the pressurized fluid, preferably air, into the interior of the rotor 30. The rotor 30 in turn has apertures 76 in bottom wall 74 which communicate the bottom end of the rotor 30 with the interior of the base or tub section 77 to enable the lower end of the rotor 30 and the tub section 77 to be cleaned. Any pellets flushed from the rotor and inside screen 28 are discharged through the dried pellet outlet chute 40.

The top of the rotor 30 inside top section 39 is also a hang-up point and subjected to high pressure fluid, preferably air, to dislodge accumulated pellets. A nozzle 110 directs the high pressure air across the top 112 of the rotor 30 to drive any accumulated pellets out of the top section 39 and into the pellet outlet chute 40. The nozzle 110 is fed by air hose or line 114 which extends through top plate 47 and is connected to the high pressure air source (not shown).

The base or tub section 77 is attached to the bottom plate 100 of the housing 26 and water tank 49 by screws 78 or other fasteners to stationarily secure the housing and screen to the water tank 49. In addition to hang-up points or areas occurring in the dryer structure, another hang-up point occurs in a water box bypass line which includes valves 82 to bypass the water box 84 of the underwater pelletizer 12 as illustrated schematically in FIG. 1. This enables water flow from the pump 86 to directly enter the slurry pipe 14. The valves 82 provide a hang-up point in the water box bypass line 80.

To alleviate collection of pellets in the water box bypass 80 the section of pipe 80 is provided with a small diameter nipple, a check valve and an air hose 88 connected with an air injection port that purges any pellets out of the water box bypass 80. This air purge also creates a high pressure water surge into the dryer which serves to clean the agglomerate catcher 16 and base section 48 of the dryer 10. The agglomerate catcher 16 can also be cleaned by a separate pipe or hose 90 controlled by a solenoid valve which directs high pressure fluid onto the pellet contact side of the angled agglomerate grate or catcher plate 20 to clean the perforated plate 20 of agglomerates which are then discharged through the discharge tube or chute 18. The air purge from the water box bypass and hose 90 flushes all agglomerated pellets from the agglomerate catcher 16.

The base and tub section 77 at the lower end of the dryer includes flat areas at the port openings and seams that connect the components of the dryer housing together. The air and water purge from the water box bypass flushes the agglomerate catcher so that it can effectively flush out hung-up pellets. The water outlet from the housing to the water tank includes an enlarged discharge area and a sloped bottom to provide introduction of removed moisture and water into the water tank. Various juncture areas of the dryer components may create a hang-up point or area. However, the combination of timed air or water purges removes the pellets from the hang-up points.

A hose 94 and nozzle 95 supply bursts of air to discharge chute or pipe 40 in a direction so that it cleans the top of the rotor 30 and the pellet outlet 40. The air discharge blows any pellets past any pipe connections and the diverter valve 92 for discharge of dried pellets out of the dryer. Blower 104 draws air through the dryer during normal drying of the pellets.

The rotor 30 is preferably turning continuously during the full cleaning cycle. Solenoid valves are provided to supply air preferably at about 60 psi to about 80 psi, or more, to the water box bypass air port, rotor air ports, top section air port, pellet outlet air port and diverter valve air port. The solenoid valves include timers to provide short air bursts, preferably about three seconds, which cleans well and does not require a lot of time. A clean cycle button activates the cleaning cycle with the water box bypass air port being energized first to allow air to purge the bypass with five air bursts and the top section air port is then activated after which the pellet outlet chute diverter valve is activated but will shut down two seconds before spray nozzles are activated and wash the screen for one to ten seconds, preferably about six seconds, with the blower then being activated when the spray nozzle pump is de-energized thus completing one cleaning cycle. The above procedure works effectively on pellets of an average size.

Figure 6:
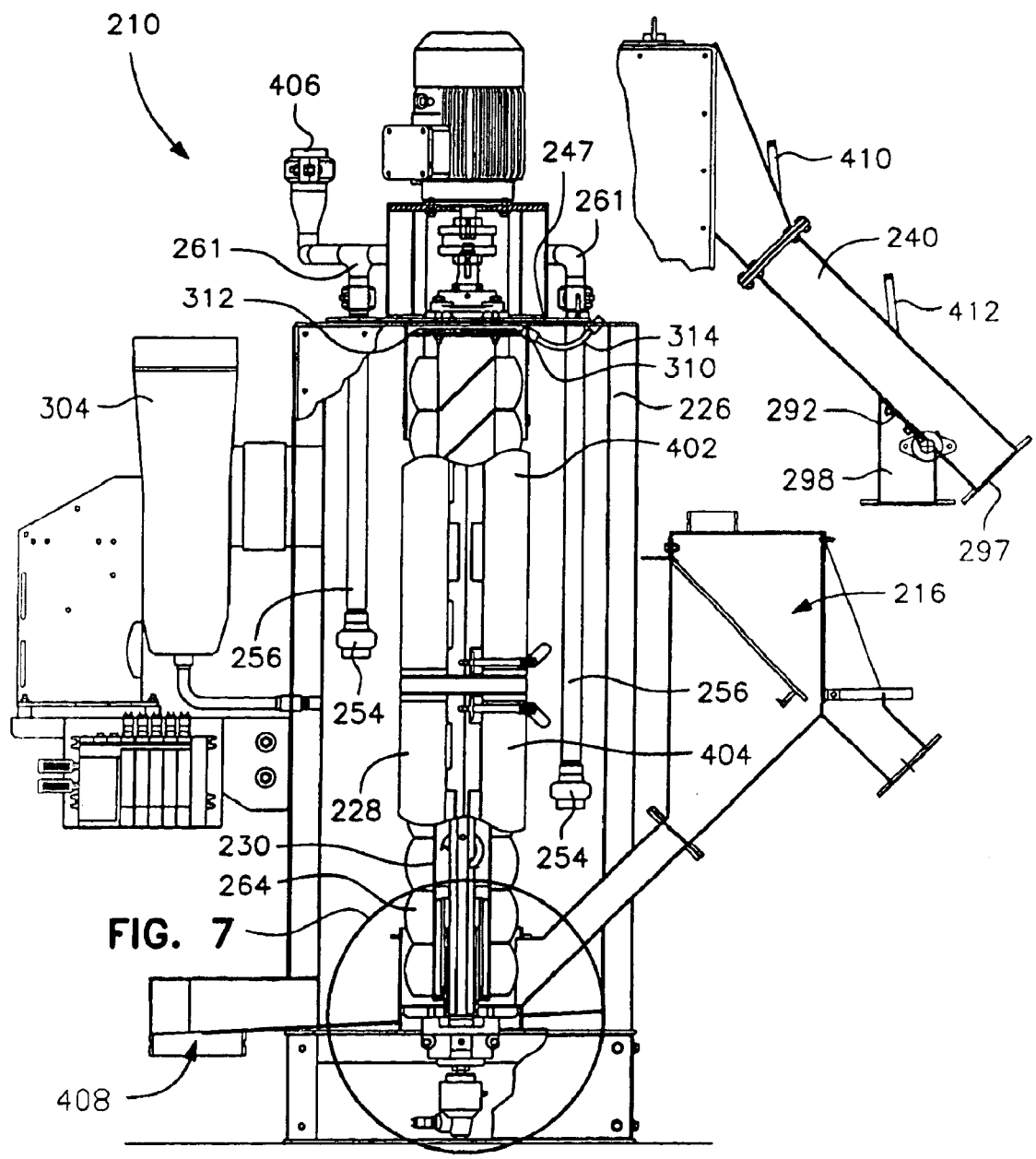
FIG. 6 is a schematic sectional view of another dryer embodying the present invention, similar to FIG. 2.
Figure 7:
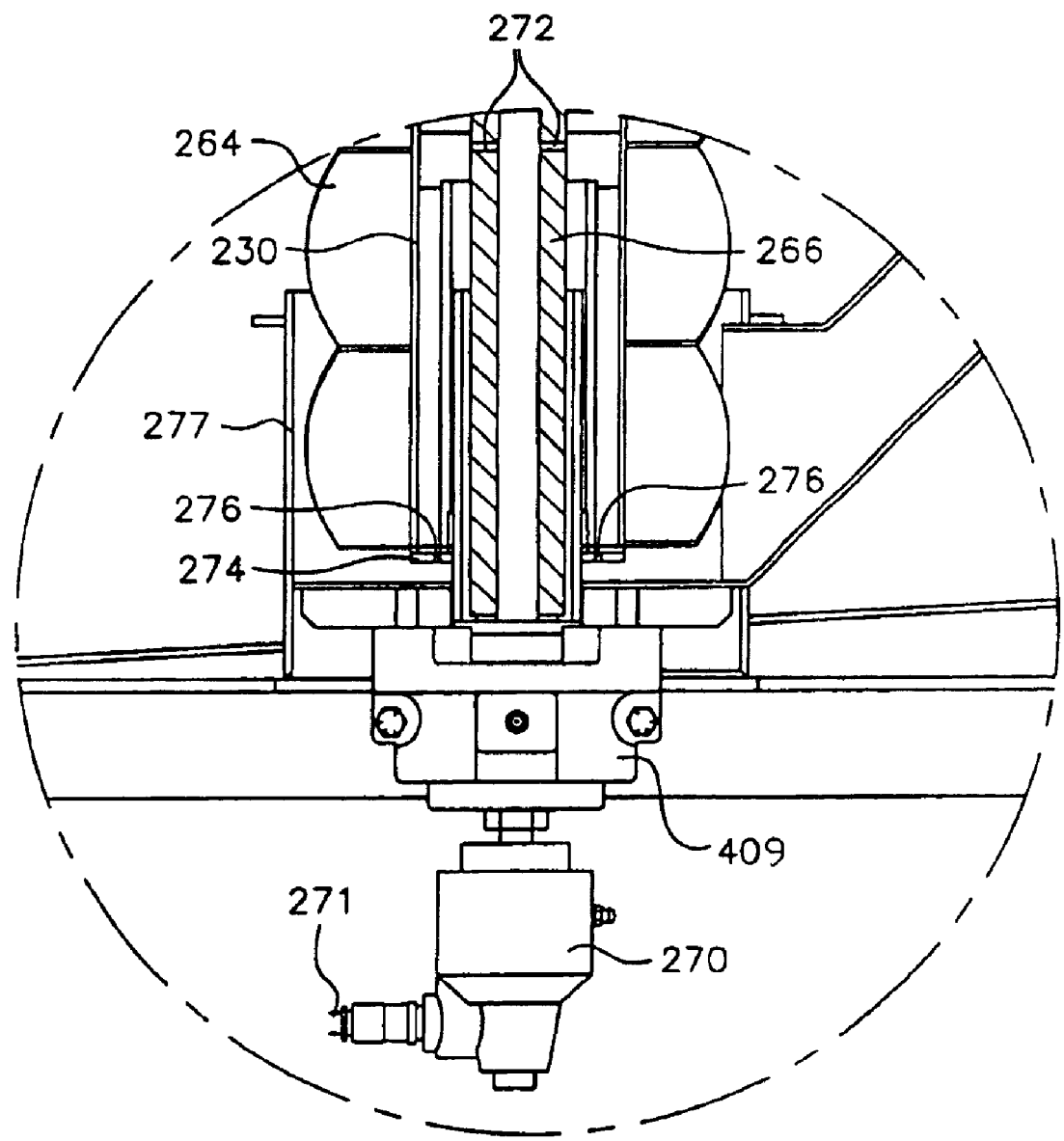
FIG. 7 is an enlarged detail sectional view from FIG. 6, similar to FIG. 3.

Turning now to FIGS. 6 and 7 of the drawings, a Gala Model 2008 dryer, modified to incorporate the structure and method of the present invention, is generally designated by reference numeral 210. Where like parts of the dryer 210 correspond with the dryer 10 of FIGS. 2–5, the numbers are the same, except that the numbers are preceded by the "2" digit, i.e., 200 series, and the 300 series is used in the FIGS. 6–7 embodiment instead of the 100 series of the FIGS. 2–5 embodiment. New components are numbered in the 400 series.

The self-cleaning apparatus of the FIGS. 6 and 7 embodiment includes three spray nozzles or spray heads 254 supported between the interior of the housing 226 and the exterior of the screen 228. The screen 228 is comprised of two screen sections 402 and 404 as known in the art. The nozzles 254 are supported by spray pipes 256 extending upwardly through the top plate 247 and are connected by lines 261 to a single water inlet 406. The spray nozzles 254 preferably spray water or other liquid against the interior walls of the housing 226 and the exterior walls of the screen 228, with the water and captured pellets exiting the dryer through drain 408.

The rotor 230 is hollow and is provided with inclined rotor blades 264 around its exterior surface. A hollow shaft 266 extends through the hollow rotor 230 in concentric spaced relation thereto. The lower end of the rotor 230 is supported in bearing assembly 409, and the hollow shaft 266 extends through the bearing assembly 409 for connection to the rotary coupling 270. The coupling 270 is then connected to a source of high air pressure through hose or line 271.

The hollow shaft 266 includes apertures 272 to communicate with the interior of the hollow rotor 230, which holes 272 introduce the pressurized air into the interior of the rotor 230. The bottom of the rotor 230 in turn has apertures 276 in its bottom wall 274 which direct the pressurized air towards the bottom of the base or tub section 277, thus driving any accumulated pellets outwardly and upwardly into the rotating rotor 230 and rotator blades 264.

As shown in FIG. 6, the top of the rotor 230 is also subjected to high pressure air through nozzle 310, which directs the high pressure air across the top 312 of the rotor 230 and underneath the top plate 247. Hose or line 314 connects the nozzle 310 to a source of high pressure air.

The discharge chute or pipe 240 of the FIGS. 6 and 7 embodiment is shown separately since it can be installed either on the front or back of the dryer 210, as shown in FIG. 6. In this embodiment, there are separate nozzles for the discharge pipe 240 and the diverter valve 292. Specifically, air hose 410 feeds a nozzle which directs high pressure air down the discharge chute 240, and air hose 412 directs high pressure air directly at the diverter valve 292.

Based upon the foregoing description, taken together with the patent drawings, one skilled in the art should easily be able to establish a time cleaning sequence for the high pressure water and high pressure air flushing of any particular centrifugal pellet dryer. However, for further guidance, a self-cleaning sequence in accordance with the present invention utilizing the FIGS. 6 and 7 embodiment will hereafter be described.

The operator would start the self-cleaning process by pressing a "Start Cleaning Cycle" button associated with the PLC.

Step 1: the water box bypass piping solenoid would energize the valve to air hose 88 to pulse air on for three seconds to create a high pressure water surge into the dryer. The solenoid would then turn the air supply off for three seconds. This on/off sequence should be repeated five times.

Step 2: the top section solenoid is then energized pulsing air through nozzle 310 for three seconds and then off for three seconds. This sequence is repeated five times.

Step 3: the pellet resin outlet solenoid is then energized to pulse air through line 410 for three seconds and then off for three seconds; this sequence is repeated five times.

Step 4: the pellet diverter valve solenoid is then energized to pulse air through line 412 for three seconds and then off for three seconds; this sequence also repeated five times.

Step 5: the blower motor for blower 304 is de-energized.

Step 6: the cleaning pump motor for delivering high pressure water to the spray nozzles 254 is energized, thus causing high pressure water spray to exit spray nozzles 254, for a period of six seconds.

Step 7: the blower motor for blower 304 is then re-energized.

Steps 1–7 are repeated automatically for five consecutive sequences. Upon completion of the fifth sequence, the cleaning cycle is complete.

As mentioned previously, the rotor 230 is rotating during the entire cleaning process, as well as during normal pellet drying operation. Hence, the rotor is on continuously, thus causing very little down time for the dryer. It is only necessary to run the cleaning cycle (while the rotor 230 is continuing to turn) when switching over to a new pellet material to be dried.

While the invention has been described specifically with respect to centrifugal pellet dryers, for which it is especially preferred, the cleaning apparatus and method of this invention can also be adapted to dryers associated with other forms of pelletizers, such as strand and hot face pelletizers. It is not intended that the present invention be limited solely to centrifugal pellet dryers.

The foregoing is considered as illustrative only of the principles of the invention. Further, numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A self-cleaning centrifugal pellet dryer for removing surface moisture from pelletized product in the form of a slurry of pellets and water comprising a housing, a cylindrical screen mounted within said housing in spaced relation to the housing, a pellet lifting rotor positioned within screen, a motor drivingly connected to said rotor, a slurry inlet communicating with an interior of said screen, a dried pellet outlet communicating with the interior of said screen, and a fluid pressure nozzle assembly positioned interiorly of said housing and externally of said screen for discharging pressurized fluid toward said screen and housing for cleaning pellets from said screen and housing.

2. The dryer as claimed in claim 1, wherein said spray nozzles are spaced circumferentially around the screen and in radially spaced relation to the interior of the housing and the exterior of said screen for cleaning the external surface of the screen and the internal surface of said housing.

3. The dryer as claimed in claim 2, wherein said spray nozzles are positioned in staggered vertical position in relation to said screen and housing to clean all surfaces of the screen and housing.

4. The dryer as claimed in claim 1, wherein said rotor includes a hollow shaft positioned in an elongated vertical hollow body, said hollow shaft including a rotary connection to a source of pressurized air, said hollow shaft including air passages communicating the hollow shaft with the interior of the hollow body of the rotor, said rotor including a bottom having apertures therein for discharging pressurized air into a lower section of said housing for dislodging pellets from said lower section of said housing.

5. The dryer as claimed in claim 1, wherein said slurry inlet is positioned at a lower end of said housing, said dried pellet outlet is positioned at an upper end of said housing, and said motor is mounted on said upper end of said housing.

6. The dryer as claimed in claim 1, wherein an agglomerate catcher is positioned in advance of said slurry inlet for removing pellet agglomerates from said slurry before entering said slurry inlet.

7. The dryer as claimed in claim 1, wherein a pellet dewaterer is positioned in advance of said slurry inlet to remove bulk water from said pellet and water slurry before said pellets enter said slurry inlet.

8. The dryer as claimed in claim 1, wherein said dried pellet outlet includes a discharge chute and a diverter valve in said chute to enable the discharge of dried pellets to selected discharge openings.

9. The dryer as claimed in claim 6, further comprising a cleaning spray nozzle associated with said agglomerate catcher for directing pressurized fluid against an agglomerate screen to clean agglomerates from said screen for discharge from said agglomerate catcher.

10. The dryer as claimed in claim 8, further comprising a cleaning spray nozzle associated with said discharge chute for directing high pressure fluid to dislodge pellets from said diverter valve and to clean said dried pellet outlet and said upper end of said housing and rotor.

11. The dryer as claimed in claim 1, further comprising an underwater pelletizer and a slurry pipe circuit associated with said dryer, including a water box bypass pipe provided with a high pressure for injecting air into said bypass pipe to clean said bypass pipe and related valves and cause a high pressure water surge into said dryer for cleaning purposes.

12. A method of self-cleaning a centrifugal pellet dryer having a housing a cylindrical screen mounted within said housing in spaced relation to the housing, a pellet-lifting rotor positioned within said screen, a motor drivingly connected to said rotor, a slurry inlet communicating with an interior of said screen, and a dried pellet outlet communicating with the interior of said screen, in which dried pellets become lodged in hang-up points in said dryer, which comprises directing high pressure fluids in a timed sequence from spray nozzles selectively positioned inside said dryer toward said hang-up points while continuing to drive said rotor during a cleaning cycle.

13. The method as claimed in claim 12, wherein said high pressure fluids includes water flowing at a rate between about 80 gpm and about 100 gpm.

14. The method as claimed in claim 12, wherein said high pressure fluids includes air at a pressure of at least 60 psi.

15. The dryer as claimed in claim 4, wherein said pressurized air is continuously discharged into said housing lower section while said dryer is in operation.

16. A self-cleaning centrifugal pellet dryer for removing surface moisture from pellets exiting an underwater pelletizer which comprises a housing, a cylindrical screen mounted within said housing in spaced relation to the housing, a generally hollow pellet lifting rotor positioned within said screen, a motor drivingly connected to said rotor, a slurry inlet communicating with an interior of said screen, a dried pellet outlet communicating with the interior of said screen, a liquid pressure nozzle assembly positioned interiorly of said housing and externally of said screen for discharging pressurized liquid toward said screen and housing for cleaning pellets from said screen and housing, and said rotor having apertures therein for discharging pressurized air at least into a lower section of said housing for dislodging pellets from said lower section of said housing.

17. The dryer as claimed in claim 16, wherein said pressurized liquid is discharged from said pressure nozzle assembly at a rate of at least about 40 gpm, and said pressurized air is discharged from said hollow rotor at a pressure of at least about 60 psi.

18. The dryer as claimed in claim 16, wherein said dried pellet outlet includes a discharge chute and a diverter valve in said chute to enable the discharge of dried pellets to selected discharge openings and a cleaning spray nozzle associated with said discharge chute for directing high pressure fluid to dislodge pellets from said diverter valve.

19. The dryer as claimed in claim 18, wherein said high pressure fluid also cleans said dried pellet outlet and an upper end of said housing and rotor.

20. The dryer as claimed in claim 16, further comprising an agglomerate catcher positioned in advance of said slurry inlet for removing pellet agglomerate from said slurry before entering said slurry inlet and a cleaning spray nozzle associated with said agglomerate catcher for directing pressurized fluid against an agglomerate screen to clean agglomerates from said screen for discharge from said agglomerate catcher.

* * * * *